Aug. 10, 1965    D. B. PALL    3,199,526
FLOAT OPERATED SEPARATOR
Original Filed Jan. 13, 1961

United States Patent Office 3,199,526
Patented Aug. 10, 1965

3,199,526
FLOAT OPERATED SEPARATOR
David B. Pall, Roslyn Estates, N.Y., assignor to Pall Corporation, Glen Cove, N.Y., a corporation of New York
Continuation of application Ser. No. 82,442, Jan. 13, 1961.
This application Apr. 18, 1963, Ser. No. 274,393
7 Claims. (Cl. 137—192)

This application is a continuation of application Serial No. 82,442, filed January 13, 1961, now abandoned.

The present invention relates to a float-controlled valve designed for use in fluid separators and the like, and, more particularly, to a separator valve which effectively will drain off water separated from hydrocarbon fuel by any suitable separator device and to fluid separators incorporating such drain valves.

The use of water separators in the fuel systems of marine engines, off-road machinery motors and engines designed for intermittent service, is important, due to the ease with which water can enter the fuel storage tanks and lines of such equipment. One of the great problems in the design of such separators is the removal of water that is separated from the fuel. This can be done manually, from time to time, by removal and cleaning out of a sump, but obviously an automatic drain is the best expedient. The available designs of such a drain have not been satisfactory, due to difficulties in the sealing of the valve, and in the size required for a conventional float valve lever mechanism. In order to lift the valve, a rather large float and mechanisms has been necessary, and this has made the valve drain sump quite bulky. The size has made such equipment impractical in small boats and off-road machinery.

The valve of the present invention gives automatic and periodic drainage of a sump whenever the level of liquid in the sump exceeds a predetermined level, and provides for collection of liquid to this level by the valve lever float mechanism.

The valve comprises a float, and a piston valve operatively connected with the float so as to be opened and closed by movement of the float. The valve is operatively connected to the float through a pair of scissored levers. The leverage ratio applied through the levers by the motion of the float to the valve is not constant, but is designed to be at a maximum upon initial movement of the float in a direction to open the valve. The levers thus apply relatively great opening force to the valve upon initial movement of the float, providing the high level of force required for "break out" of the valve seal, to overcome the "break out" friction between the piston and the cylinder. In a typical embodiment, the initial force at the beginning of the valve stroke may be applied by a leverage ratio which may be about 200:1, and theoretically the initial force can even be infinite.

After the initial opening, the piston still partially blocks the outlet of the valve. At the same time, the leverage ratio applied by the scissored levers of the invention decreases gradually after the opening stroke, to a minimum of, for example, about 8:1 at the end thereof. However, the force required to open the valve further is less, since the valve is now partially opened. Hence, if the float is moved further, beyond the position at the initial valve opening, the valve opening still responds thereto, so that the valve can be opened wider to give a greater outlet opening if the rate of collection increases, up to the full opening of the valve.

Consequently, if, for example, after the valve is opened to a degree to allow drain off of water in the sump at a rate equal to that at which it is collecting, the rate of water collection increases, the valve will be opened proportionately upon further movement of the float to increase the drainage rate. The drainage capacity thus automatically will be increased to be equal to or greater than the inflow into the sump. The drainage capacity will of course be designed to equal inflow capacity, if this be necessary.

The valve of the invention is particularly adapted for use as a drain valve in fuel-water and like dispersed liquid separators, in which it is especially advantageous because of its small size, enabling its installation in the housing for the engine without enlargement beyond its normal dimensions. Such a separator will usually include a filter which will remove dirt particles of a size of five microns and larger. Contaminated fuel enters the separator through a port in the casing of the unit and flows through a glass fiber coalescer element. The fuel passes through the filter element, and dispersed liquid water entrained in the fuel collects on the surface or within the element. The small dispersed water droplets coalesce into drops large enough to fall by gravity through a pool of fuel in a lower sump having a depending outlet drain, which is fitted with the float-controlled drain valve of the invention. The float is raised by the separated water, and when it has reached the predetermined limiting position at the end of its free play, the scissored levers actuate and open a water-ejection valve normally held closed by the internal fluid pressure in the sump. The valve preferably is of the piston-lift type, which in the closed lower position blocks the drain outlet, and is lifted by the float and scissored levers against the force of the internal fluid pressure within the sump to open the drain outlet.

For a fuller understanding of the invention, reference should be had to the drawings, in which.

In the drawings, like numerals identify similar parts throughout.

Figure 1:
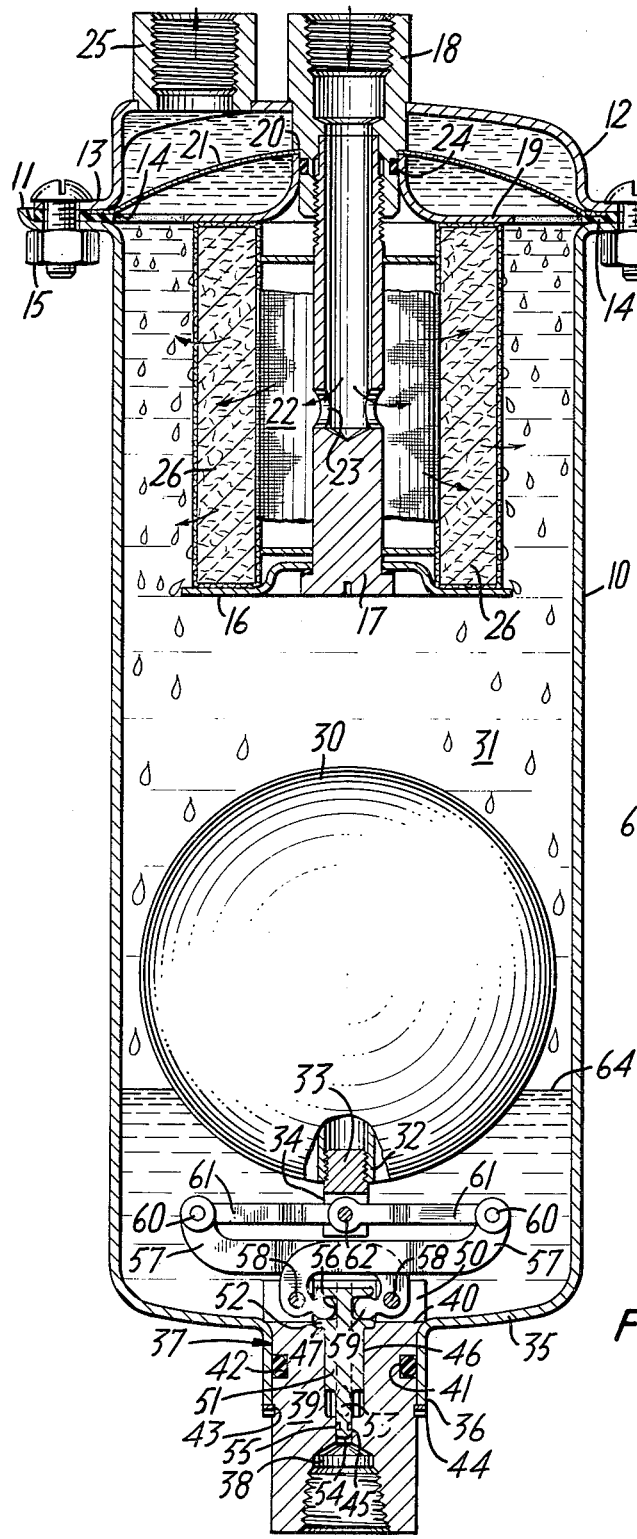
FIG. 1 is a side elevational view, with parts broken away and in section, of a fuel-water separator embodying a float-operated drain valve of the invention, illustrating the relative positions of parts of the valve operating mechanism thereof in the closed position of the valve and in dot-dash lines the relative positions of these parts in the open position of the valve.

The fuel-water separator illustrated in FIGURE 1 comprises a casing preferably formed of an inverted cup-shaped filter bowl 10, having a lateral annular flange 11, and an opposed filter head 12 provided with a cooperating annular flange 13. The annular flanges 11 and 13 are abutted with an annular gasket ring 14 interposed and suitable means, such as a plurality of bolts 15, clamp these elements together in a fluid tight manner to provide a casing for the unit. A bottom plate 16 is attached by the hollow bolt 17 to the inlet fitting 18 which in turn is attached to the filter head, for example, by welding. The plate 16 supports a cylindrical coalescer element 26 whose top surface engages a top plate 19 fitting into an indentation 20 in the side of the inlet fitting. It will be seen that the filter bowl 10 can be removed without disturbing the filter head 12, so that the coalescer, which remains attached to the head, can be removed for servicing or replacement, without disturbing the inlet and outlet connections, and without undue loss of fuel.

Fitted in the indentation 20 and held in place therein by the plate 19 is one end of a separator element 21, the other end of which is supported between the gasket 14 and the flange 13. The coalescer encloses a filtering chamber 22. Flow communication between the filtering chamber 22 and the inlet is provided by a plurality of drain holes 23 formed through the side wall of the hollow bolt 17. The O ring 24 ensures a leakproof seal between the top plate and the inlet fitting, so that all fluid entering the filtering chamber must pass through the coalescer.

The top of head 12 is also provided with an outlet fitting 25. Both inlet 18 and outlet 25 are designed for connection to the fuel system.

The float-operated drain valve mechanism includes hollow float 30 mounted for free up and down motion in sump chamber 31 and equipped with an internally-threaded socket 32. An externally-threaded end 33 of an adapter stud or fork 34 (see FIG. 3) is threadably engaged in float socket 32. The float can also be brazed or welded to the stud 34.

The float 30 is of a size to fit closely within the bowl 10, allowing for passage of liquid past it into lower part of the sump 31, but close enough to prevent joining in the event the separator unit is tilted, as would occur in marine use. If desired, the inside wall of the bowl 10 can be equipped with a number of guide vanes surrounding the float, to space it from the wall a sufficient distance to permit passage of fluid and also prevent jamming of the float against the wall.

The filter bowl 10 is provided with a closed transverse bottom end 35 provided with a depending neck 36 through which is passed a tubular valve body 37 having a through bore 38 serving as a drain outlet. The bore 38 preferably is provided with an internally-threaded bottom end section to be threadably engaged with suitable drain tubing. The cylindrical valve body 37 has a tubular shank 39 which passes through depending neck 36, and an enlarged head 40 seated upon the inner face of transverse end wall 35 closing off the bottom of bowl 10. The tubular shank 39 of valve body 37 preferably is provided with an annular groove 41 in which is snugly seated a gasketing O ring 42 and another annular groove 43 in which is seated a snap ring 44 abutted against the lower edge of depending neck 36 to hold the parts snugly together.

The bore 38 of the valve body 37 preferably is provided with an intermediate waist constriction 45 constituting a valve seat, with upper section 46 of the bore providing a cylindrical valve piston chamber. The top end of chamber 46 preferably is counterbored to provide a cylindrical throat 47.

Valve 51 is of the piston type, having a cylindrical head 52 slidably seated in throat 47 and carrying a depending stem 53 having a reduced end section 54. The external surface of the depending stem 53 is provided with an annular groove in which is seated an O ring 55, with the latter having a snug slidable fit against the valve seat 45.

Provision of an O ring piston type valve seal is particularly advantageous in a fluid separator. It makes possible an effective seal without the need to apply force from the float to maintain the seal leakproof when the valve is closed. Furthermore, a seal of this type accommodates itself to dirt which may be entrained in fluid draining through the valve and lodge in the seal itself, because of the nature of the O ring seal.

Figure 3:
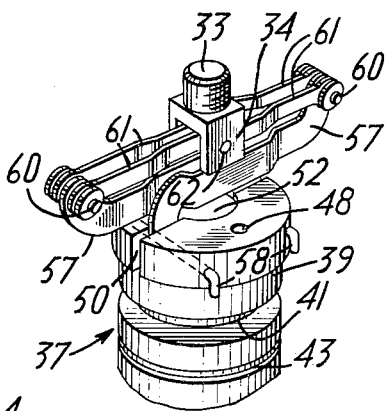
FIG. 3 is a perspective view to smaller scale, with parts broken away and others omitted, of the valve body, piston valve and linkage means for connecting the latter to the float of the separator illustrated in FIG. 1.

The cylindrical head 52 of piston valve 51 is provided with an annular groove 56 to form a spool in which is engaged portions of scissored levers constituting portions of a linkage means connecting the float 30 to the piston valve. The scissored levers of the linkage connecting means are preferably provided in the form of a pair of levers 57, each of which may be S-shaped. Each lever 57 is pivotally supported in cross-slot 50 by a transverse hinge pin at 58. As is indicated in FIG. 3, each hinge pin 58 is inserted in a through transverse hole provided in the enlarged head 40 of valve body 37 and extending substantially normal to the cross-slot 50. A rounded hook-shaped nose 59 of each S-shaped lever 57 is engaged in the annular groove 56 of the piston valve head or spool 52 for transverse rocking motion therein. The opposite end of each S-shaped lever is pivotally connected at 60 to a link 61, with the latter in turn pivotally connected at 62 to the adapter fork 34. As is best illustrated in FIG. 3, the links 61 have inner ends thereof lapped together and swingably received in the notch of adapter fork 34 with a common pivot extending therethrough at 62.

In the present valve operating mechanism a limited degree of free play is provided to avoid a possibility of the levers 57 being lowered by the float to a reversed jamming position after the liquid collected in the sump has been fully drained. This lost motion is provided preferably by loose connections at the pivot pins 60 which connect outer ends of levers 57 to links 61. This may be provided by forming the hole in the outer end of each lever 57, or that in the links 61, or both, slightly larger than the diameter of the pivot pin 60. The lost motion may also be provided by forming a relatively short longitudinal slot in the end of each lever 57, or link 61, or both, in which will ride the pivot pin 60. In any case, the lost motion is only slight, and is not intended to permit significant deviation of links 61 from the horizontal without applying force to levers 57.

Each S-shaped lever 57 fundamentally provides a hook-shaped member having a depending and inwardly turned nose 59 with the bight of the hook being pivotally supported at 58. The remaining portion of this hook-shaped lever member extends transversely and radially outward to serve as a liftable pull section for connection to the pull applying means in the form of link 61. The outer end of each lever preferably is turned upwardly in the vicinity of the pivotal connection at 60 to the link 61, but this is not essential to practice of the invention.

The nose 59 of the hooked work-applying end of each lever 57 is defined by a rounded camming surface and the hooked ends of the pair of levers are arranged in opposition to each other to act together in the nature of scissored tongs with their camming noses slidably engaging beneath an abutment carried by the piston valve 51. This abutment is defined by the top flange of the valve head spool 52.

It will be understood that advantageous use of the linkage means which connects the float 30 to the piston valve 51 does not require both levers 57 and both links 61, but the employment of all of these members is preferred in a practical embodiment. One of the levers 57 and the links 61, pivotally connecting it to float 30 will serve to lift the piston valve 51 with diminishing applied pull. However, the employment of the paired levers 57 and paired connecting links 61 assures the application of opposed and balancing forces to the piston valve 51, so as to avoid any tendency to apply an unbalanced pull to one side which may develop misaligning wear on one side of the valve.

Figure 2:
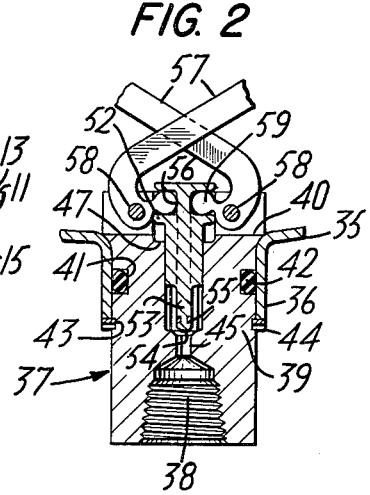
FIG. 2 is a side elevational view of the valve of FIGURE 1, showing the positions of these parts in the open position of the valve.

In operation of the fuel-water separator, illustrated by way of example in the drawings, the fuel pump in the fuel supply system for the engine supplies liquid hydrocarbon fuel through the inlet 18 to the filter chamber 22. The fuel passes through the coalescer 26 to the separator 21 and thence via outlet 25 to the engine carburetor. Any dirt particles in the fuel will be deposited on the surface of the coalescer 26, and entrained droplets of water contaminating the fuel will be coalesced to form larger drops emerging on the other or outer side of the coalescer. The heavier water drops will then fall down into the sump 31. The lighter drops still entrained in the fuel are too large to pass through the separator 21, are filtered out here, and coalesce eventually to form drops large enough to fall down, in turn, to the sump 31 of the filter bowl 10. The separated water will accumulate in the bottom of sump 31, to provide therein a body 64 thereof which will apply buoying force to the float 30 for lifting it. As the quantity of water collected in the sump increases to apply buoying force to the float 30 the latter is lifted freely to the predetermined position permitted by the lost motion at the pivot connections 60. The links 61 are swung upwardly slightly to oblique positions without applying pull to levers 57. Thereafter, further increase in the quantity of collected water causes its buoying force and the accompanying additional elevation of the float 30 to apply through oblique links 61, at 60, pull to the outer ends of levers 57. Consequently, the outer ends of levers 57 are initially lifted and the outer ends of the levers are swung upwardly toward each other about their pivots 58, applying initially an enormous pulling force to the valve 51 more than sufficient to overcome break-out friction between the valve and its seat 45. As the outer ends of the levers 57 are lifted from their valve-closed and at rest positions, shown in FIG. 1, up toward their valve-open positions shown in FIG. 2, the levers are scissored together so as to rotate upwardly the lever camming noses 59 with sliding contact against the underface of the top flange of the valve spool head 52 which serves as the operating abutment on the piston valve 51.

Servicing of the separator is quite simple. Removal of the bolts 15 enables the operator to remove the filter bowl 10 and accompanying drain valve, giving access to the filter head and coalescer assembly at the same time. Either can be serviced or replaced without disassembly of the other.

In the initial application to the piston valve 51 of pull sufficient to overcome valve break-out friction, the force applied by this leverage is at maximum. Theoretically, the ideal initial positions of the outer force receiving pull links 61 and end sections of levers 57 beyond their mounting pivots 58 for attainment of maximum pull force on valve 51 are horizontal. In such positions they are arranged normal to the direction of the working force of float buoying. In this position, an infinite force would be applied to the valve by the levers. As the float 30 continues to rise, the force applied to the piston valve 51 by the leverage ratio gradually is diminished and is at a minimum at the top of the stroke. Such leverage design makes possible the ready attainment of an effective leverage ratio which diminishes proportionate to the force required further to open the valve in response to increased collection requirements, throughout the valve stroke from the valve-closed lower position to the full open upper position. The downward and inward hooking of the pull-applying ends 59 of the levers 57 makes the linkage connection between the float 30 and piston valve 51 compact.

The lower flange of the valve spool head 52 provides effective stop means for cooperating with the bottom surface of the counterbored recess 47 in the valve body 37, so that the piston valve cannot be blown out. Thus, the spool flange and the cooperating bottom surface of the counterbored recess 47 define means to limit downward movement of the valve stem 53 to assure maintenance of its gasket ring 55 in the valve seat 45 in a valve-closed position.

The drain valve of the invention can be employed not only in a fluid separator, such as is shown in the drawings, but as an air escape valve in a liquid system, designed to be automatically cut off by rise of liquid to a predetermined level. In this type of system, the drain valve can be vertical, as shown in the drawings, or inverted, with the float hanging down. When the liquid level rises sufficiently in the bowl or housing 10, the float is raised to the position at which the drain valve, normally open, is closed, shutting off the escape of air and liquid.

The drain valve can be mounted in any type of storage or settling tank to drain off a heavier liquid that settles from a lighter one, such as the separation of water from fuel storage tanks, home fuel oil tanks, chemical storage tanks, elimination of liquids from gases, such as separation of water from air, steam, and other gases. In this use, the complete separator unit including the coalescer, can be used as well, if desired.

Having described my invention, what I claim as new and desire to secure by Letters Patent is:

1. A separator for removing a dispersed heavy liquid from a suspending lighter liquid, comprising, in combination, an upright casing, a coalescer in said casing, a liquid collecting sump chamber therebelow, and at the bottom of the casing a float-operated valve comprising, a float for liquid-buoyed motion above a discharge outlet in the sump chamber, a valve seat about the discharge outlet, a valve below said float closing said seat and movable axially away therefrom, and linkage means connecting said float to said valve including pull link means pivotally supported at one end to said float and at another end to one end of a lever positioned between said float and valve, the levers being pivotally supported at an intermediate fulcrum point separate from and fixed with respect to said movable valve, said pull link means being pivotally attached to an upstanding portion of said lever in a manner such that the pull link means is substantially horizontal when said valve is in a closed position, said lever having on the opposite side of the fulcrum point a thrust-applying end, said thrust-applying end being turned inwardly to define a hook with its tip swung upwardly by lift of said force-receiving end, means connecting said valve to said hook to cause said hook in upward swing to thrust said valve away from the said seat, and the pull link means due to their horizontal position with respect to the lever and float giving to the lever and thus to said valve initially a relatively great opening force with movement of said float in a direction to open the valve, and thereafter a gradually diminishing amount of force as said float continues to move in said direction.

2. A separator as defined in claim 1 in which said linkage means includes a pair of said levers provided with their outer end sections lapped and crossing over in opposite directions to the fulcrum points thereof with the latter being transversely-spaced and located to opposite sides of the path of motion of said valve and with said hooks arranged in opposed and reversed relation and connected to opposite sides of said valve, and a pair of pull link means connected to said float and pivoted to the outer force-receiving ends of said levers to scissor the latter upwardly toward each other with float movement.

3. A separator as defined in claim 2 in which the discharge outlet extends downwardly from the chamber and said valve is of the lift type.

4. A separator as defined in claim 3 in which said lift valve is a piston valve.

5. A separator as defined in claim 2 in which said levers are in the form of S-shaped members arranged in relatively reversed positions, the pull-applying hook ends of said levers being arranged in opposed relation and slidably engaging said valve on opposite sides thereof for simultaneous opening of the latter with scissoring of the outer end sections of said levers.

6. A separator as defined in claim 2 in which the ends of the outer end sections of said levers are turned upwardly, said pull link means being a pair of links each having one end pivotally connected to said float and the other end pivotally connected by pivot means to the upturned end of one of said levers.

7. A separator for removing a dispersed heavy liquid from a suspending lighter liquid, comprising, in combination, an upright casing, a coalescer in said casing, a liquid collecting sump chamber therebelow, and at the bottom of the casing a float-operated valve comprising a float chamber for liquid-buoyed motion, a discharge outlet in the sump chamber, a value seat about the discharge outlet, a valve closing said seat and movable by pull away therefrom in a certain direction, and linkage means connecting said float to said valve including a pair of lateral levers each having a depending upwardly-swingable pull-applying end connected on opposite sides to said valve for lift of the latter by upward swing of the former in opposite directions, and an outer upwardly-swingable force-receiving end with said ends located on opposite sides of a fulcrum point separate from and fixed relative to said movable valve and with each lever being provided with a separate fulcrum point, means pivotally supporting said levers at their separate fixed fulcrum points with portions of said levers between their respective fixed fulcrum points and force-receiving ends extending laterally in opposite directions generally normal to the direction of valve motion, each of said force-receiving ends having an upwardly turned portion, said lateral portions being crossed to form a scissoring leverage, and a pair of pull link means connected to said float and extending substantially horizontally in the closed position of said valve and pivoted to the upwardly turned portions of the force-receiving ends of said levers to scissor the latter upwardly toward each other with upward swing of said force-receiving ends upon float rise to apply pull to said valve from opposite sides and move it away from said seat, said pull link means because of their horizontal position giving to said valve initially a relatively great opening force with rise of said float in a direction to open the valve, and thereafter a gradually diminishing amount of force as said float continues to rise.

References Cited by the Examiner
UNITED STATES PATENTS

| | | | |
|---|---|---|---|
| 637,148 | 11/99 | McBride | 137—185 |
| 2,208,390 | 7/40 | Richter | 137—192 |
| 2,809,712 | 10/57 | Muller | 137—430 XR |
| 2,845,947 | 8/58 | Griswold | 137—172 XR |

FOREIGN PATENTS

| | | |
|---|---|---|
| 1,234,993 | 5/60 | France. |
| 523,694 | 4/55 | Italy. |

WILLIAM F. O'DEA, *Primary Examiner.*

ISADOR WEIL, *Examiner.*